United States Patent [19]

Montague et al.

[11] Patent Number: 5,675,782
[45] Date of Patent: Oct. 7, 1997

[54] CONTROLLING ACCESS TO OBJECTS ON MULTIPLE OPERATING SYSTEMS

[75] Inventors: David S. Montague, Bellevue; Pradyumna K. Misra, Issaquah; Michael M. Swift, Bellevue, all of Wash.

[73] Assignee: Microsoft Corporation, Redmond, Wash.

[21] Appl. No.: 465,990

[22] Filed: Jun. 6, 1995

[51] Int. Cl.6 .................................................. G06F 17/30
[52] U.S. Cl. ...................... 395/609; 395/610; 395/200.17
[58] Field of Search ................................ 395/600, 448, 395/250, 427, 609, 610, 200.17, 728, 800, 186; 379/95

[56] References Cited

U.S. PATENT DOCUMENTS

| | | | |
|---|---|---|---|
| 5,263,157 | 11/1993 | Janis | 395/600 |
| 5,276,901 | 1/1994 | Howell et al. | 395/800 |
| 5,335,346 | 8/1994 | Fabbio | 395/600 |
| 5,446,903 | 8/1995 | Abraham et al. | 395/728 |
| 5,469,576 | 11/1995 | Dauerer et al. | 395/186 |
| 5,493,728 | 2/1996 | Solton et al. | 395/250 |
| 5,495,521 | 2/1996 | Rangachar | 379/95 |
| 5,539,906 | 7/1996 | Abraham et al. | 395/600 |
| 5,555,388 | 9/1996 | Shaughnessy | 395/427 |
| 5,559,984 | 9/1996 | Nakano et al. | 395/448 |

OTHER PUBLICATIONS

Novel Inc, "Novel Netware Version 3.11", Novel Incorporated, pp. 192–271 Mar. 1991.

Primary Examiner—Thomas G. Black
Assistant Examiner—Frantz Coby
Attorney, Agent, or Firm—Ronald M. Anderson

[57] ABSTRACT

A method and system for controlling access to entities on a network on which a plurality of servers are installed that use different operating systems. A request is entered by a user at a workstation on the network to set access permissions to an entity on the network in regard to a trustee. In response to the request, various application programming interfaces (APIs) are called to translate the generic request to set permissions on the entity into a format appropriate for the operating system that controls the entity. Assuming that the user has the appropriate rights to set access permissions to the entity as requested, and assuming that the trustee identified by the user is among those who can have rights set to the entity, the request made by the user is granted. Entities include both "containers" and "objects." Entities are either software, such as directories (containers) and files (objects), or hardware, such as printers (objects).

22 Claims, 7 Drawing Sheets

CONTROLLING ACCESS TO OBJECTS ON MULTIPLE OPERATING SYSTEMS

FIELD OF THE INVENTION

The present invention generally relates to controlling access to objects on a network, and more specifically, to a method and apparatus for controlling access to objects on a network in which a plurality of operating systems are used.

BACKGROUND OF THE INVENTION

Most operating systems for networks include provisions for controlling access to entities that are stored on the network or coupled to the network. The term "entity" is intended to broadly encompass hardware such as gateways to other networks, printers, and modems, and software such as directories, files, application programs, data, records, fields in a record, and cells in a spreadsheet—in other words, virtually any hardware or software aspect of a computer network. Regardless of whether the network is simply two computers coupled peer-to-peer, or a wide area network with thousands of users, a security system will typically be included to limit access rights to entities on the network and to identify each user that can connect to the network. As used herein, the term "access rights" is synonymous with "access permissions."

Control of access to entities on a computer network is very important. Data that are personal in nature or which comprise proprietary or sensitive information should not be freely accessible or usable by all of the individuals connected to the network. For example, E-Mail messages should only be accessible by the intended recipient. Personnel data files that include details about each employee in a corporation should only be accessible by a limited group, e.g., only by people in the human resource department of the corporation. The right to change the contents of files, read files, or execute files must often be restricted to specified users to maintain the network integrity or to satisfy licensing requirements that limit the number of people who can execute a program.

A network administrator is typically assigned the responsibility for establishing and maintaining defined groups of users, determining who has the right to connect to the network, and for initially determining the rights of each group and individual in respect to entities on the network. A group will normally include one or more users having some common relationship to the entities for which access rights are initially granted. For example, clerks in the accounting department of a corporation might comprise an "Accounting Group," which has full rights to certain accounting programs and to certain accounting data files, and limited rights to others. The manager of the accounting department would typically be a member of the "Accounting Group" and might also be a member of an "Accounting Supervisor Group," which has full rights to more sensitive accounting data files, and limited rights in extremely sensitive accounting data files.

The rights granted to a group or an individual determine whether members of that group or that user can control access to other entities on the system. Thus, a user with full rights in a directory can control access by other users on the network to that directory and to subdirectories of that directory or files that the user creates within that directory.

One form of access control to entities employs access control lists (ACLs) comprised of a set of access control entries (ACEs). An ACL may be associated with an entity on the network. An ACE typically includes an identifier (platform or operating system specific) for a user or a group and some encoding or representation that specifies the rights granted or denied to that user or group with regard to the object. An individual or group granted (or denied) rights to an object is referred to throughout this specification and in the claims that follow as a "trustee." The access mask represents an encoding of operations relevant to the entity and/or to the environment in which it is used. Accordingly, the ACL specifies who has access to the entity and the nature of that access.

Each network operating system, such as MicrosoR Corporation's WINDOWS NT™ and Novell Corporation's NETWARE™, employs different protocols and formats for controlling access to entities on the network. An access control program is typically included with the operating system to establish the access rights for trustees to the various types of entities on the network, by producing the ACL for the entity. However, the access control programs for the different network operating systems are generally incompatible with each other, because of differences in the format and protocols that they use. In addition, the mechanism by which a new entity is assigned or inherits an ACL may be different on different network operating systems. For this reason, special purpose tools are required to manipulate access controls for each different network operating system/platform.

In larger networks, it is common for several different servers to be interconnected, and for the servers to be running different network operating systems and software. Under these circumstances, controlling access to objects on the network becomes more difficult. In order to establish access control on an object, it is first necessary to determine the server with which the object is associated or by which its access is controlled. Then, the appropriate tool or utility program for manipulating access control in the network operating system running on that server must be used to create or modify the ACL for the entity.

The task of controlling access to an entity may not be limited only to the network administrator; any trustee with the appropriate rights can establish access controls to the entity. Accordingly, requiring each such trustee to be familiar with the access control tools provided with each different network operating system is an unduly onerous burden to impose. Clearly, it would be much more efficient and require less specialized knowledge of the trustees on a network if setting access permissions could be made to appear independent of the network operating system and unique platform specific access control mechanism that controls access to an entity. Certain access operations that are generic to any entity, regardless of the network operating system involved, could then be effected by a trustee having the requisite rights, without requiring the trustee to possess intimate knowledge of the underlying network access protocol or tool.

SUMMARY OF THE INVENTION

In accordance with the present invention, a method is defined for controlling access to an entity on a network, where the entity comprises one of a plurality of different types of entities. The method includes the step of determining each trustee that can have access permissions to the entity by querying the network operating system. A genetic request for controlling access to the entity is selected from a set of predefined genetic requests. The genetic request that was selected is translated into a format usable by the network operating system. Subsequently, the network operating system is caused to implement the request.

The entity preferably comprises either a container or an object and may include software or hardware aspect of the network.

The method further comprises the step of enabling a user to request setting specific access rights to an entity associated with an application, from within the application, if the user possesses a right to set the specific access rights to the entity.

In response to a request by the user, the network operating system determines the trustees that can have the specific access rights assigned to them and returns a list of the trustees in a format that is independent of the network operating system on which the specific access rights are to be set. A user must have the right to grant access to the entity and can only affect the access rights of a trustee on the list. Another step of the method is to enable a user to view a trustee's access permissions to an entity.

Preferably, the set of predefined generic requests includes at least one of: (a) granting of access rights to the entity; (b) setting access rights to the entity; (c) denying access rights to the entity; (d) revoking explicit access rights to a specific entity; (e) replacing all access rights to the entity; (f) determining if access to the entity is permitted; (g) getting effective access rights for a specific entity; (h) listing trustees who have explicit access rights to the entity; and, (i) enumerating all trustees who may be granted access rights to the entity.

Another aspect of the present invention is directed to a system for controlling access to an entity on a network. The components of the system include a processor. A plurality of machine instructions are executed by the processor to control the access to the entity. Execution of the machine instructions causes the processor to enable the user to specify at least one of a plurality of predefined generic requests for use in controlling access to the entity. In addition, the machine instructions executing on the processor comprise translation means for translating the specified predefined generic request for access control to the entity into a system request having a format usable by a network operating system running on a server associated with the entity. Implementation of the system request by the network operating system running on the server sets access to the entity accordingly.

Other elements and aspects of the system generally correspond to the steps of the method discussed above.

BRIEF DESCRIPTION OF THE DRAWINGS FIGURES

The foregoing aspects and many of the attendant advantages of this invention will become more readily appreciated as the same becomes better understood by reference to the following detailed description, when taken in conjunction with the accompanying drawings wherein.

DESCRIPTION OF THE PREFERRED EMBODIMENT

Figure 1:
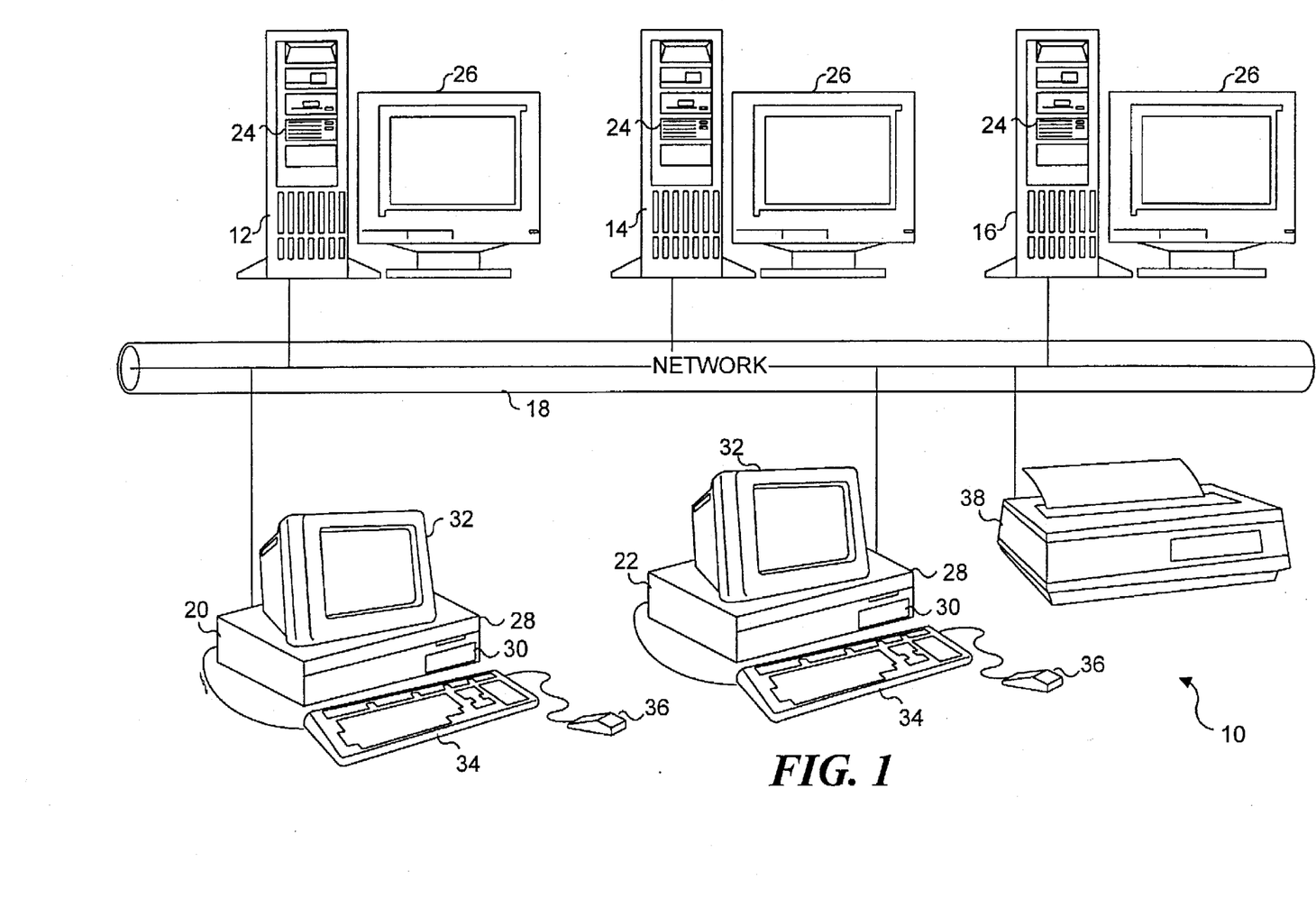
FIG. 1 is a block diagram of a portion of a network that includes a plurality of workstations and a plurality of servers on which access is controlled in accordance with the present invention.

The present invention will typically be implemented on a network that includes a plurality of servers running under different operating systems. A portion of an exemplary network 10 on which the invention might be used is shown in FIG. 1. Although not necessary to realize the advantages of the present invention, network 10 can be part of a wide area network in which different geographical locations are interconnected, either by high-speed data lines or by radio links, perhaps interconnecting hundreds of workstations at widely disparate locations. However, in the simplified diagram of FIG. 1, only three servers 12, 14, and 16 are shown, coupled by an Etherlink™ network to two workstations 20 and 22, and to a printer 38. It will be understood by those of ordinary skill in the art that the present invention is also usable on other types of network configurations, such as a token ring or star configuration.

As is typical in a network, each of servers 12, 14, and 16 includes at least one hard drive 24 on which are stored a plurality of files, including data and applications that can be accessed by the workstations. In addition, each server is provided with a monitor 26. Although not specifically shown, each server can also be coupled to a keyboard for entry of commands and data used in configuring and controlling the operation of the server.

Each of the workstations 20 and 22 includes a processor chassis 28 and a hard drive 30 for storing programs, which can be executed by a central processing unit (CPU) that is disposed on a motherboard (neither shown) within processor chassis 28. A display screen 32 is coupled to the display port of the processor chassis on each of the workstations.

The user can control the workstation and provide input of commands and data via a keyboard 34 and/or a mouse 36 (or other suitable pointing device). Each of workstations 20 and 22 can access any of servers 12, 14, or 16 through network 18. In addition, if the user who is signed-on to one of the workstations has the proper permissions, that workstation can direct printer output from an application to printer 38. Printer 38 includes its own network interface card (not shown), as do each of the workstations. Alternatively, printer 38 can be coupled to a print server (which may be another workstation), so that it communicates with the network through the parallel port of the print server and through the network interface card of the print server. These variations are well known to those of ordinary skill in the art of configuring and administering networks and need not be further discussed.

Although some networks employ multiple servers that run the same operating system, it is becoming increasingly common for a network to be coupled to a plurality of servers, each of which run different operating systems. For example, in network 10, server 12 may be booted up to run on Microsoft's WINDOWS NT™ operating system; server 14 may run under Novell's NETWARE™; and server 16 may operate under Distributed Computing Environment (DCE) UNIX or some other DCE compliant operating system. It is not intended that the present invention in any way be limited by the specific operating systems running on each of the plurality of servers in a network with which it is used. The method and system for controlling access to entities on the network to which the present invention is directed can readily be implemented to work with virtually any type of operating system and on almost any network configuration, and is not limited to those mentioned above.

As explained in the Background of the Invention, one of the primary functions of almost any network operating system is to control access to various software and hardware entities assigned to, controlled by, or otherwise associated with a server or workstation on which the operating system is running. However, each of these operating systems running on the various servers used in a network, such as servers 12, 14, and 16, may use different formats and parameters for setting the permissions that control access to each such entity by the users of the network. The entities to which access is controlled comprise both software resources such as directories (or folders) and files, and hardware objects such as printer 38. Thus, a user who has signed onto network 10 at workstation 20 would normally need to be aware of the appropriate format and command structure to set the access permissions to a particular file that is stored on one of these three servers on the exemplary network. First, however, the user would need to identify the server that is responsible for controlling access to the file or entity. Since the format and specific access commands used on each server that employs a different operating system will be different, it will be apparent that carrying out routine operations to set or modify access permissions to entities on a network that includes multiple servers running multiple operating systems can be both difficult and confusing.

The present invention is a set of routines for controlling access to certain entities on a network in a manner that does not require a user to identify the appropriate server and does not require that the user know the format for setting access permissions in the operating system running on that server. The routines comprising the present invention can either be part of a network operating system, integrated into or accessed from an application, or may be provided as separate stand-alone application on a network. Generally, the routines enable a user to identify a specific entity for which access rights are to be set or modified. The routines, not the user, will determine the server that controls a specific entity. Once the user selects the entity, the trustee, and indicates the access rights to be applied, the routines will determine if the user has the right to set the requested permissions and whether the trustee has the required permissions relative to the entity, and if so, will convert the user's request into the appropriate format and function calls implemented in the operating system running on the server that controls the entity.

In a preferred embodiment of the present invention, these routines comprise a set of relatively high-level application programming interfaces (APIs). These APIs provide a relatively easy way to manipulate access to virtually any type of entity on a network that includes servers using different operating systems. While it is likely that certain operations relating to security or setting access permissions will be outside the scope of the generic control provided by these APIs, a user can always call a platform or operating system-specific API to accomplish such non-generic tasks. Thus, a goal of the present invention is to enable a user to control access rights for various entities on a network in a simple way that satisfies a majority of the requirements for setting permissions to the entities, while generally insulating the user from the various formatting and other operating system-specific access control parameters.

Figure 2:
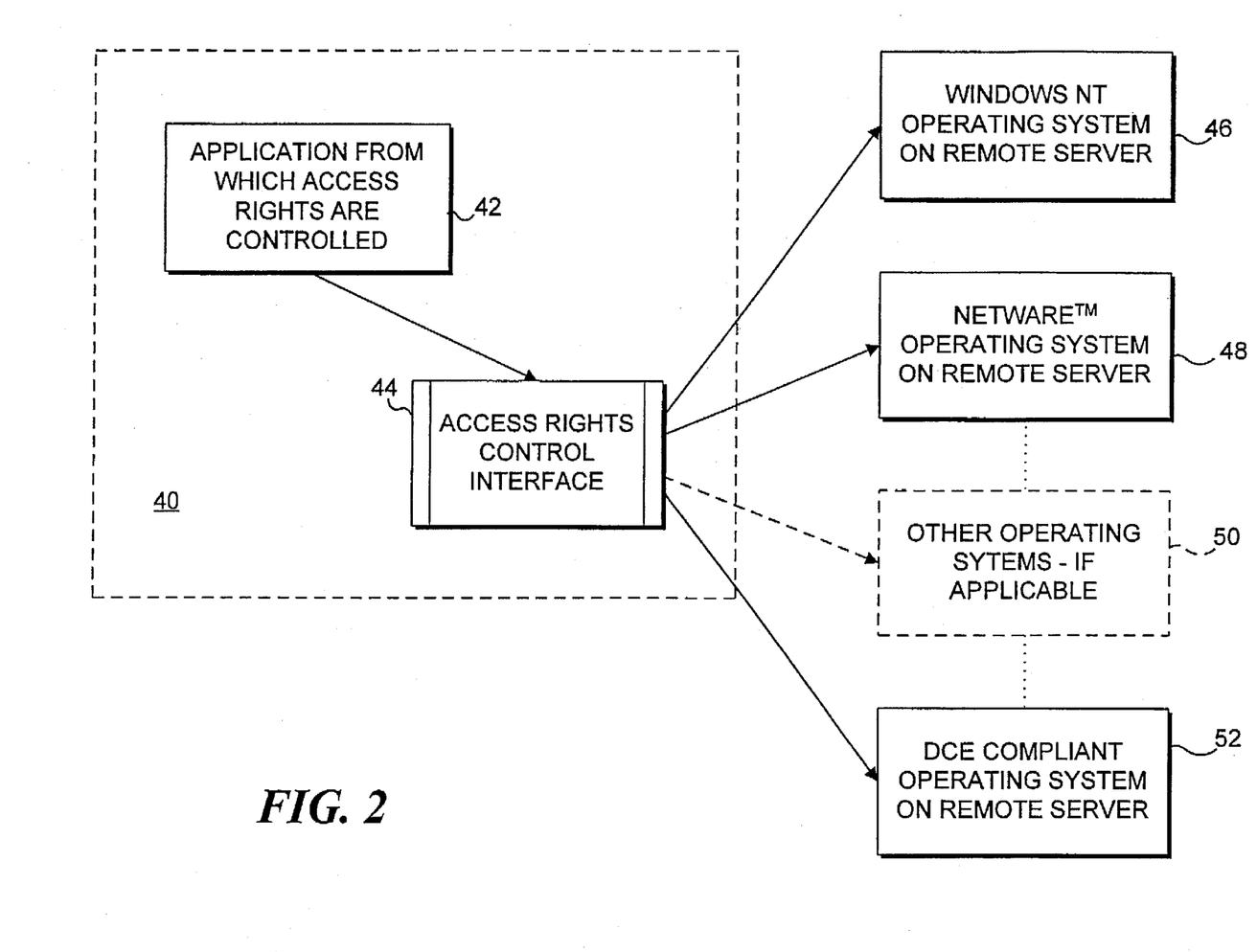
FIG. 2 is a functional block diagram illustrating the relationship between an application that executes on a workstation and the servers through which access to an entity is controlled using the present invention.

FIG. 2 is a functional block diagram, which is an overview illustrating how the present invention accomplishes genetic access control for an entity on network 10. A user will likely access the network from a workstation, which is represented by a dash line block 40. A block 42 represents an application (program) from which access rights are to be controlled by the user at the workstation in block 40. It should be noted that the present invention can also be implemented from within an operating system shell (or desktop) or can be configured as a stand-alone utility. The application in block 42 from which the access permissions to an entity are to be set communicates with an access rights control interface in a block 44. This interface, which is coupled to the application and is thereby informed of the specific entity for which the permissions are to be set, causes the system to automatically determine the server that has the responsibility for controlling access to that entity and determines if the user has the rights to set the requested access permission for the entity.

Conceptually, each operating system/server maintains some form of persistent database that specifies each trustee for which access rights can be set in regard to any entity controlled or associated with the server and a data structure that specifies requisite access controls. In the WINDOWS NT™ operating system, the database is called an "access control list"(ACL), but other types of data structures can also be used for this purpose. Normally, a network administrator is responsible for adding and deleting trustees from the list of trustees potentially active on a server. This function is not part of the present invention. As explained below, using the present invention, a user having appropriate permissions can readily access the database of trustees that specifies the trustees on a server and display the list of trustees for whom access permissions can be set on a specific entity controlled by that server. The process by which this is accomplished in the present invention is transparent to the user, and it is generally not necessary for the user to know the server that controls the entity for which access rights are to be modified, nor for the user to know the specific format used in the operating system running on that server in order for the user to set or modify the access rights to an entity. However, the user must have the permissions to modify the access rights to the entity in order to do so, and the trustee granted such rights must then have the required permissions.

In applying the permissions to an entity, the user defines a trustee and permission pair by selecting one or more trustee(s) from the list of possible trustees and selecting the type of access that will be set for the entity in regard to the selected trustee(s). The interface in the present invention translates the request made by the user to the appropriate format from the generic format that was presented to the user. The interface then communicates the translated request to the appropriate operating system and server, as indicated in blocks 46 through 52. Although the operating systems in blocks 46, 48, and 52 are identified by name in this example, in block 50, provision is made for using the present invention to control access permissions to entities controlled by other operating systems not listed in the other blocks.

In the preferred embodiment of the present invention, a graphic user interface operating system simplifies the selection of the entity for which the access permissions are to be set and the selection of the trustee(s) and type of access for the selected entity. However, the interface need not run under a graphic user interface; it can alternatively be implemented in a text-based operating system, or be programmed as an integral part of an application. The graphic user interface used in the preferred embodiment of the present invention simplifies the selection of an entity, trustee(s), and access rights. For example, to activate the access rights control interface in block 44 of FIG. 2, the user simply selects a menu item (or control button—not shown), which is designated for that purpose.

Figure 3:
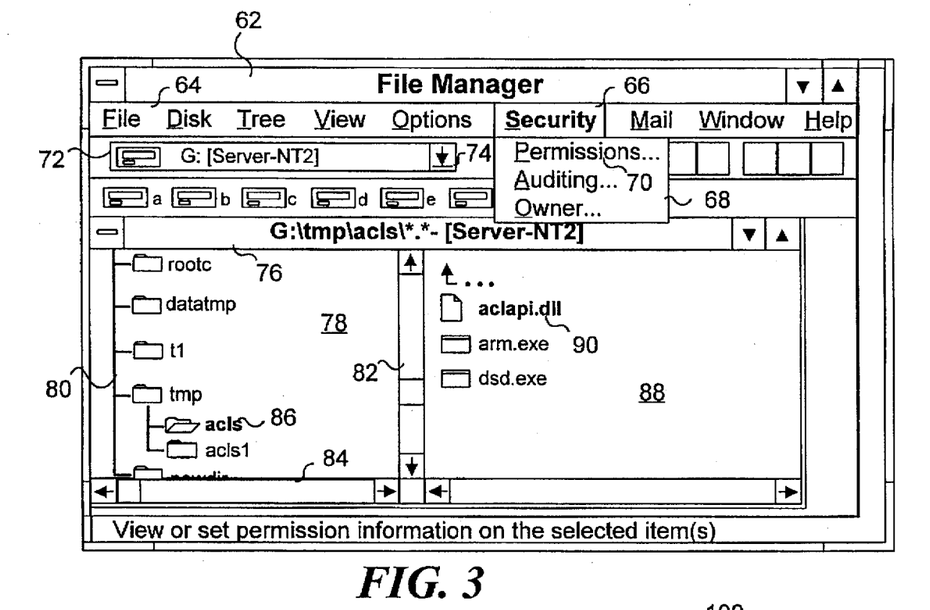
FIG. 3 is a reproduction of a File Manager screen that includes a menu enabling a user to selectively control access to a software entity.
Figure 4:
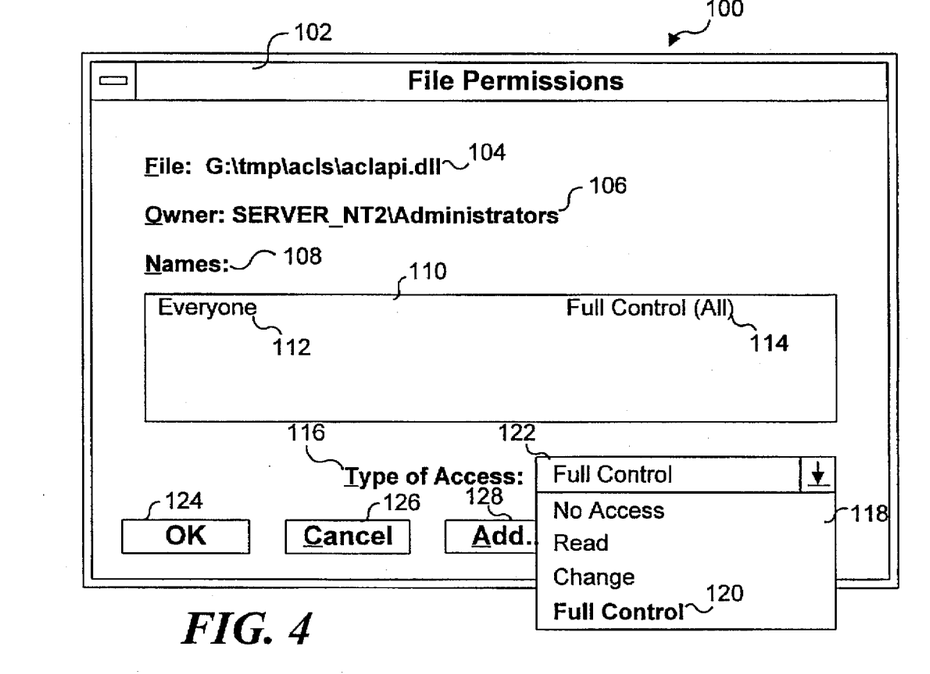
FIG. 4 is a reproduction of a File Permissions dialog box that enables the user to select the trustee(s) and set the permissions for the trustee for a software entity.

In a screen that is reproduced in FIG. 3, a specific example is shown of an application program (File Manager) in which the user can set the security permissions for a particular directory or file that has been selected. Many of the details of the example discussed below are not particularly relevant to the present invention, but are included to meet the obligation to fully disclose the preferred embodiment. The example illustrated is not intended to in any way limit the scope of the invention, since the invention can be used in many other applications and in other operating systems. A title bar 62 identifies the application from which the present invention is accessible. As shown in this Figure, an option 66 labeled "Security" has been selected from a menu bar 64, causing a plurality of additional menu options to be displayed in a drop-down list box, the first of which is an option 70, reading "Permissions . . . " By choosing option 70, the user can set the access rights and trustee in regard to a file or directory, as will be explained below. A drive selection window 72 appears below menu bar 64, enabling a user to select one of the drives on the network using a drop-down box activated by a button 74 to display a list of the available network drives. In the example illustrated, a directory tree window 78 displays a portion of a directory tree 80 for a drive G, which the user has selected. The user can choose a folder, causing the documents and files within that folder to be listed, as shown in an adjacent list window 88. Once the user has selected a specific document from those shown in the list window and has chosen Permissions under the security menu item, a File Permissions dialog box 100 will open on the display screen as shown in FIG. 4, enabling the user to set the access permissions for the document chosen.

The File Permissions dialog box in the illustrated example includes an entry 104 that identifies the path and selected folder or file for which permissions are to be set. A text line 106 indicates the owner of the selected document and a list box 110 lists the trustee(s) who currently have any access permissions to the selected document. Within the list box, an entries 112 and 114 respectively indicate that "Everyone" has "Full Control (All)." In other words, for this example, trustees comprising a group labeled Everyone currently have permission to access, delete, change access permissions, read, and write (i.e., change) the document identified in line 104.

The entry in line 114 within list box 110 can be modified, as indicated in a line 116 that appears below the list box, by entering the "Type of Access" within an entry box 122 or by activating a drop-down list box 118, which is available below the entry box, from which the user can select the type of access. Currently, a selected entry 120, which reads "Full Control" is highlighted in the example, indicating that the user has elected to assign all rights to the trustee "Everyone," which was selected in line 112. Instead, the user could have limited the rights granted in regard to the document to only allow the trustees in the group "Everyone" to Read and/or to Change the document. By granting Full Control, the user has made it possible for any trustee in the group Everyone to also change the rights of others to access the document.

Figure 6:
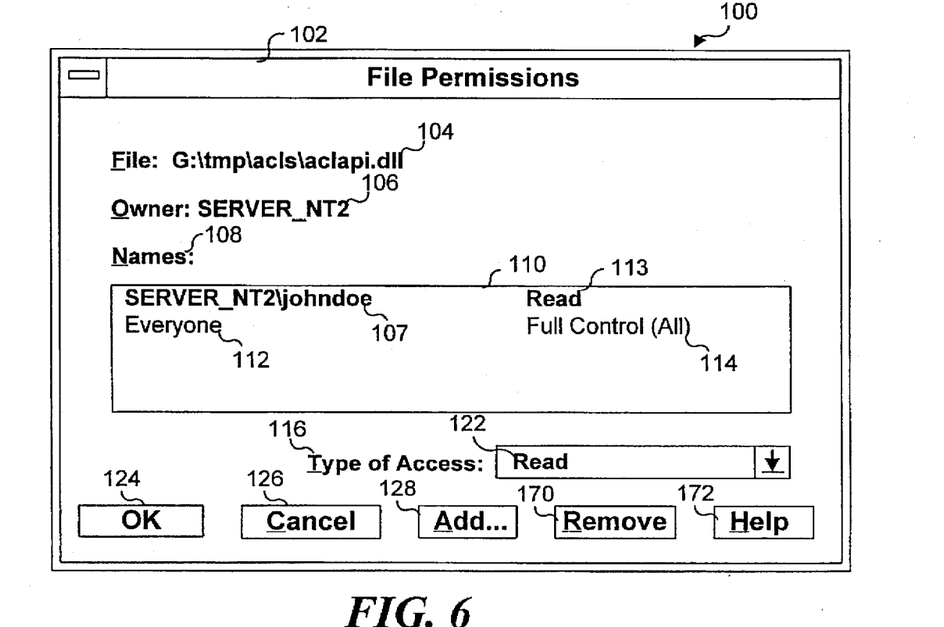
FIG. 6 is another view of the File Permissions dialog box of FIG. 4.

In another view of File Permissions dialog box 100 in FIG. 6, drop-down list box 118 is not open. This view was included to enable the option buttons at the lower portion of the File Permissions dialog box to be fully shown. Conventional option buttons include an OK button 124, a Help button 172, and a Cancel button 126. However, also included are an Add button 128 and a Remove button 170. Add button 128 is provided to enable the user to add additional trustees to the list of trustees within list box 110. When a group of trustees or an individual trustee in list box 110 has been selected and Remove button 170 is chosen, the selected group or individual trustee in the list box is deleted.

By comparing FIG. 6 with FIG. 4, it will be evident from entries 107 and 113 in the example illustrated in FIG. 6 that the limited right to Read the selected document will be granted to a specific user "johndoe" when the OK button is selected. Trustee johndoe is listed among the trustees having rights on the "SERVER NT2." This new line in list box 110 was created by selecting Add button 128.

Figure 5:
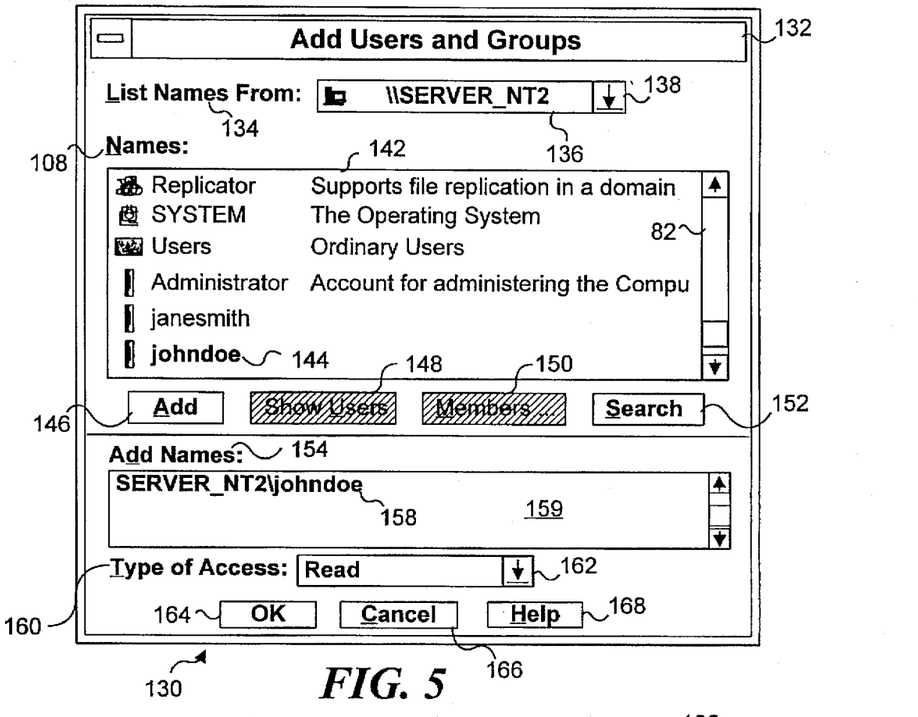
FIG. 5, is an add Users and Groups dialog box that enables a user to list trustees on a server and to add a trustee from the list to those included in the File Permissions dialog box.

When the Add button is selected by the user, an Add Users and Groups dialog box 130 opens on the display screen, as shown in FIG. 5. This dialog box includes a title bar 132, under which is a text line 134 that reads "List Names From:". Adjacent line 134 is a drop-down list box 138 in which a line 136 indicates that "\\SERVER_NT2" is currently selected as the source of the list from which a group of trustees or an individual trustee will be selected. The names of the various trustees identified as having permissions to entities controlled by SERVER_NT2 are listed in a list box 142, from which the user can view a selected portion by manipulating a scroll bar 82. Since there are normally many names in the complete list of possible trustees on a server, the list initially starts by showing only the groups. A "Show Users" button 148 can then be selected to also show the individual trustees. In addition, a Members button 150 can be selected to show only the member trustees of any group that is selected in list box 142. Note that both Show Users button 148 and Members button 150 are illustrated with cross hatching in FIG. 5 to indicate that they are grayed-out (i.e., no longer available) because the user has already activated the Show Users button.

Since the list of potential groups of trustees and individual trustees is relatively long on most servers, the user setting the permissions to an entity may need to search the list of possible trustees on a server for the name of a group or individual trustee by selecting Search button 152, which opens up a Search dialog box (not shown) similar to that used in word processing systems and in other applications to find a particular word or phrase. The user would then enter at least a portion of the name of a group or individual trustee, and the operating system would search the list of groups and trustees for the selected server.

Once the trustee (group or individual) has been found and is displayed in list box 142, either as a result of scrolling through the list or by searching, the user setting the access to the selected software or hardware entity simply selects Add button 146 to add the selected group or trustee to an Add Names list box 159. An entry 158 within the Add names list box indicates that trustee "johndoe" is to be added to list box 110 in File Permissions dialog box 100 (FIG. 6) when an OK button 164 is activated by the user. Further, a line 160 in the Add Users and Groups dialog box indicates that johndoe is to be granted limited Read only rights. As explained above, the trustee johndoe has thus been added to list box 110. After all trustees have been selected and the type of access desired has been identified, the user selects OK button 164. Any trustee(s) that appear within list box 159 are then added to those in list box 110.

Figure 7:
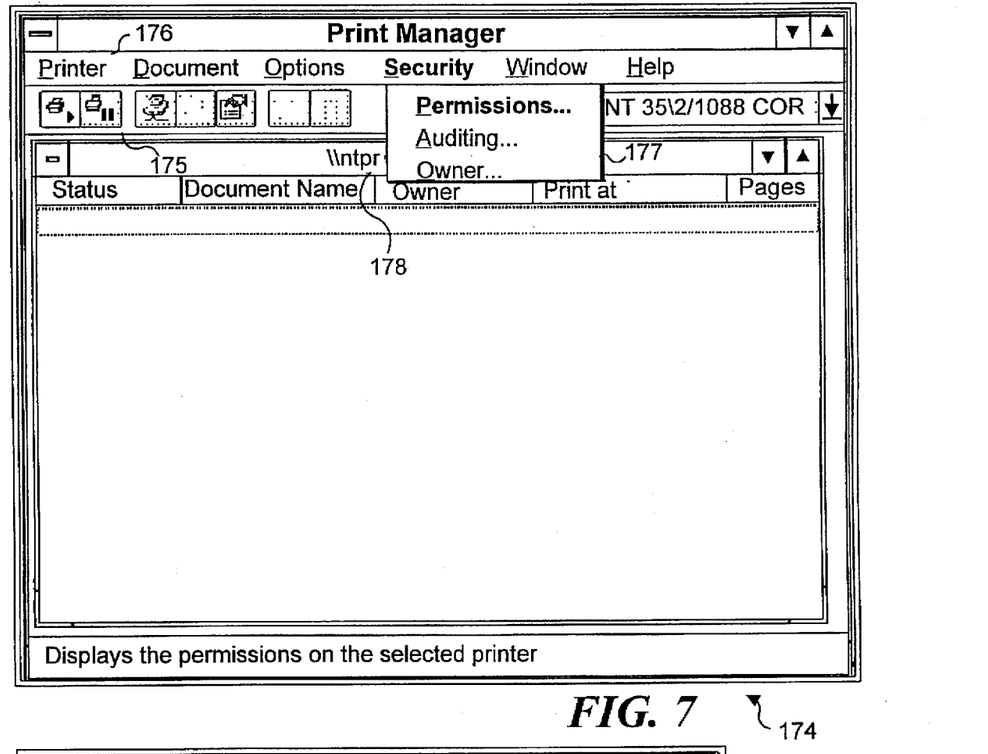
FIG. 7 is a reproduction of a Print Manager screen showing the menu items available to the user to selectively control access to a printer or printer server.

A similar procedure uses the present invention to set the access permissions for hardware entities on network 10, such as printer 38, as illustrated in connection with an example illustrated in FIG. 7. In FIG. 7, an exemplary Print Manager screen 174 is shown that includes a menu bar 176 and a button bar 175 for installing, selecting, and controlling the operation of various printers on network 10. Although only printer 38 is included in the portion of the network shown in FIG. 1, it will be apparent that many networks have printers disposed at geographically disparate locations to facilitate efficient access by users to printed output. Typically, not all printers are shared by all users. The right to direct printed output to a particular printer is controlled by setting the access permission for it so that only specific trustee(s) have access. This task is made easier in the present invention by including a Security entry in menu bar 176 that, when selected, displays the option for the user to set Permissions to a specific printer in a drop-down list box 177. A line 178 indicates that the selected printer for which the permissions are to be set in this example is "\\ntprint\laserl" (only part of which is visible, the rest being obscured by drop-down list box 177).

Figure 8:
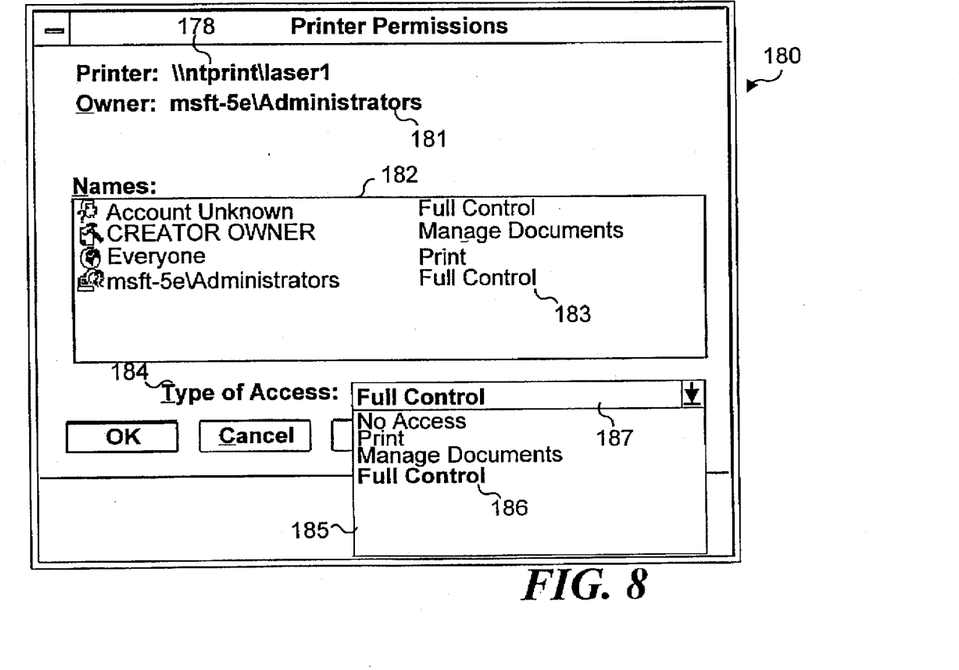
FIG. 8 is a Printer Permissions dialog box in which a user can select the trustee(s) and set the permissions for a printer or print server.

When the user selects the Permissions option, a Printer Permissions dialog box 180 opens on the display screen as shown in FIGURE 8. Line 178 in this dialog box displays the full identification of the printer. A line 181 indicates that the owner of the printer is "msft-5e\Administrators." The lower portion of Printer Permissions dialog box 180 is generally identical to that of File Permissions dialog box 100 (FIG. 6), with the exception that a list box 182 in the Printer Permissions dialog box lists a number of different groups 183 that have access rights to the printer. A line 184 indicates the Type of Access that a selected group of trustees (or individual trustee) has to the printer, in a text box 187. This entry can be typed in or selected from entries 186 that are displayed in an associated drop-down list box 185. These options include specifying that a group or individual trustee will have "No Access," be limited to "Print" only, be limited to "Manage Documents," or have "Full Control." If Full Control rights are granted, the group or individual trustee to whom they are granted will also have the right to set the access permissions of others to the printer.

The buttons on the lower portion of the Printer Permissions dialog box include OK button 124, Cancel button 126, and the Add, Remove, and Help buttons (which are obscured by drop-down list box 185). These buttons perform the same function as described in regard to setting the permissions for files.

Although only a printer has been described as an example of a hardware entity for which access permissions can be controlled by the present invention, it will be evident that access permissions for other types of hardware on a network can be controlled in a similar fashion.

In the preferred embodiment of the present invention, the graphic user interface, which is used to set the access permissions to an entity on the network, carries out that task using a plurality of 32-bit APIs, which are intended to be high-level, platform neutral, and to comprise a layer on top of existing APIs in the operating system. (It will be apparent that if the present invention is implemented in a different operating system, the routines used to set access permissions may take a different form.) Certain simplifying characterizations for the entities make it possible for these APIs to facilitate generic control of entities on a network by translating genetic requests into the appropriate format for another operating system running on a server that controls the entity.

Specifically, entities are divided into two types, "containers" and "objects." A container can have or contain "children," i.e., objects and/or other containers. In contrast, an object can not have children. For example, a container may be a directory (or folder), while an object may be a file that is contained within that directory or folder. Directories can contain other directories or files, but a file cannot. A hardware entity such as printer 38 is typically an object, since it cannot contain another entity.

Certain access rights apply to both objects and containers. In most operating systems, unless explicitly overridden, these access rights are inherited by objects and containers that are contained within a container. These rights include allowing the reading of the contents of the object, writing the contents of the object, and allowing the execution of the object, assuming that it is an executable file (on some systems, this tight is equivalent to reading the object). Thus, in most operating systems, granting a trustee Read rights to a directory will inherently grant that trustee Read rights to any directory or files contained within that directory. The user can change the attributes of objects and containers to allow reading and writing of a file and directory. Attributes specify that the object or container is hidden, read only, write only, archived, etc.

Typically, a user who has full rights to an object or container can also change the access rights of a trustee or group of trustees to that object or container, or can allow all available access to the object or container, subject only to the provision that the trustee or group is selected from the list of possible trustees maintained by the operating system that controls the object or container.

In order to make a request to set access rights to an entity comprising a container or object, the user must specify the name of the container or object (as a string) and indicate the access right that should be applied to the container or object. These requirements are met from within the graphic user screens and dialog boxes of the graphic operating system in which the preferred embodiment of the present invention is implemented, when the user makes a request to set the permissions on an entity as described above. A request entered by the user is then translated to the appropriate format, without involving the user in the details or requiring that the user understand the format needed by the remote server to carry out the request. For example, by selecting Add button 128 (FIG. 6) the user causes an API to be called that obtains a list of all the groups and/or individual trustees for objects or containers controlled by a server, enabling the user to select one or more groups or trustees and to modify the access rights for the selected group(s) and/or individual trustee(s) to the object or container. Based upon the user's selection of an appropriate menu item, as noted in the above example, a routine must be called that can implement the desired change in access rights to the selected container or object. In the preferred embodiment, the application (or operating system) in which the present invention is implemented calls a SetAccessRights API using the string name for the selected container or object and the desired generic access right. In order to make the request, the application from which the user is requesting a change in the permissions (or the user) need not know the server or the type of operating system that is running on the remote server that controls the entity. This information is obtained by the routines or APIs that comprise the interface between the application from which the request is made and each of the operating systems running on the servers coupled to the network.

It should be noted that in addition to individual users or groups of users, a trustee can comprise a service or a system, within the context of the present invention. For example, a database is a service that is treated as a trustee and can be given rights to data tables contained on another server. Similarly, a trustee may be a file server, so that access permissions to objects or containers on another server can be set for that trustee in accord with the present invention.

The generic rights controlled by the APIs in the preferred embodiment include granting access rights to an object or container for one or more named trustees. A GrantAccessRights API ensures that the trustee has at least the requested access rights. The parameters required by the API used to carry out this function include a variable, which indicates whether the resource or entity for which access is controlled is a file or directory, a printer, or a service. Typically, any owner of an object or container and those additional trustees explicitly permitted to modify access rights on an object or container will be allowed to perform the GrantAccessRights function.

Another function controlled by the routines in the preferred embodiment is labeled ReplaceAllAccessRights. This function sets the access rights on the object or container in accord with trustee and permission pairs provided by the user, so that all existing access permissions to the object or container are replaced by the new access permissions stipulated by the user. A RevokeExplicitAccessRights function specifically revokes all access rights explicitly assigned to a named trustee. Thus, the trustee can only have access to the object or container by virtue of some other means, such as membership in a group, or because "Everyone" has access to the object or container.

It should be noted that revoking all access rights to an object or container is different than denying access rights thereto. In the security scheme implemented by a particular operating system, a trustee may inherit certain rights that have not been explicitly denied or granted, based upon membership in a group.

Another function, referred to as "IsAccessPermitted," uses the name of a trustee and a requested access to query the operating system running on the appropriate server to determine if the user has sufficient rights to perform the requested operation. The function returns true if so, and false otherwise. This inquiry evaluates the access rights granted both explicitly and implicitly to the trustee based upon membership in certain groups. However, the specific operating system that controls the object or container may impact upon how a response to this inquiry is handled. In the preferred embodiment of the invention, the request that uses this function checks both the access rights listed in a discretionary database list, such as an ACL, as well as other access rights granted to the user by virtue of membership in any groups. If a user is explicitly granted certain rights to an object or container, those rights may take precedence over rights accumulated as a result of membership in a group.

Another function implemented by the present invention is "GetEffectiveAccessRights," which accepts the name of a trustee making a request and an object or container that is the subject of the request and returns the effective access rights that the trustee has in that entity. The function lists the access rights that the named user has to the entity, evaluating both the explicit and implicit rights based upon any membership in groups. Again, the access rights evaluation policies are operating system dependent.

Yet another function implemented by the present invention is "GetExplicitAccessRights." This function returns a list of trustees that have explicit access rights on an object or a container.

A final function entitled "EnumerateTrustees" lists the trustees, both users and groups, that can be granted any access on a given object or container. In other words, the function receives as input a particular object or container, and returns a list of trustees (groups and/or individuals) that can be granted or denied any form of access to the entity. In the event that there are relatively large lists in the return for this function, a flag is provided in the return to indicate that additional entries remain. Once the enumeration is completed, a flag indicating that no more entries exist is included in the return.

Using the preceding functions implemented as APIs in the preferred embodiment, the interface is able to determine whether the user requesting a change in access or permissions for a particular entity (object or container) has the access right to make such a request. If so, and if the changes are to be made with regard to a group of trustees or individual trustee that appears in the list of possible trustees for the server that controls the object or container, the requested changes are made. The user need not know anything about the underlying requirements for setting access permissions used by the particular operating system on which the changes have been made.

Figure 9:
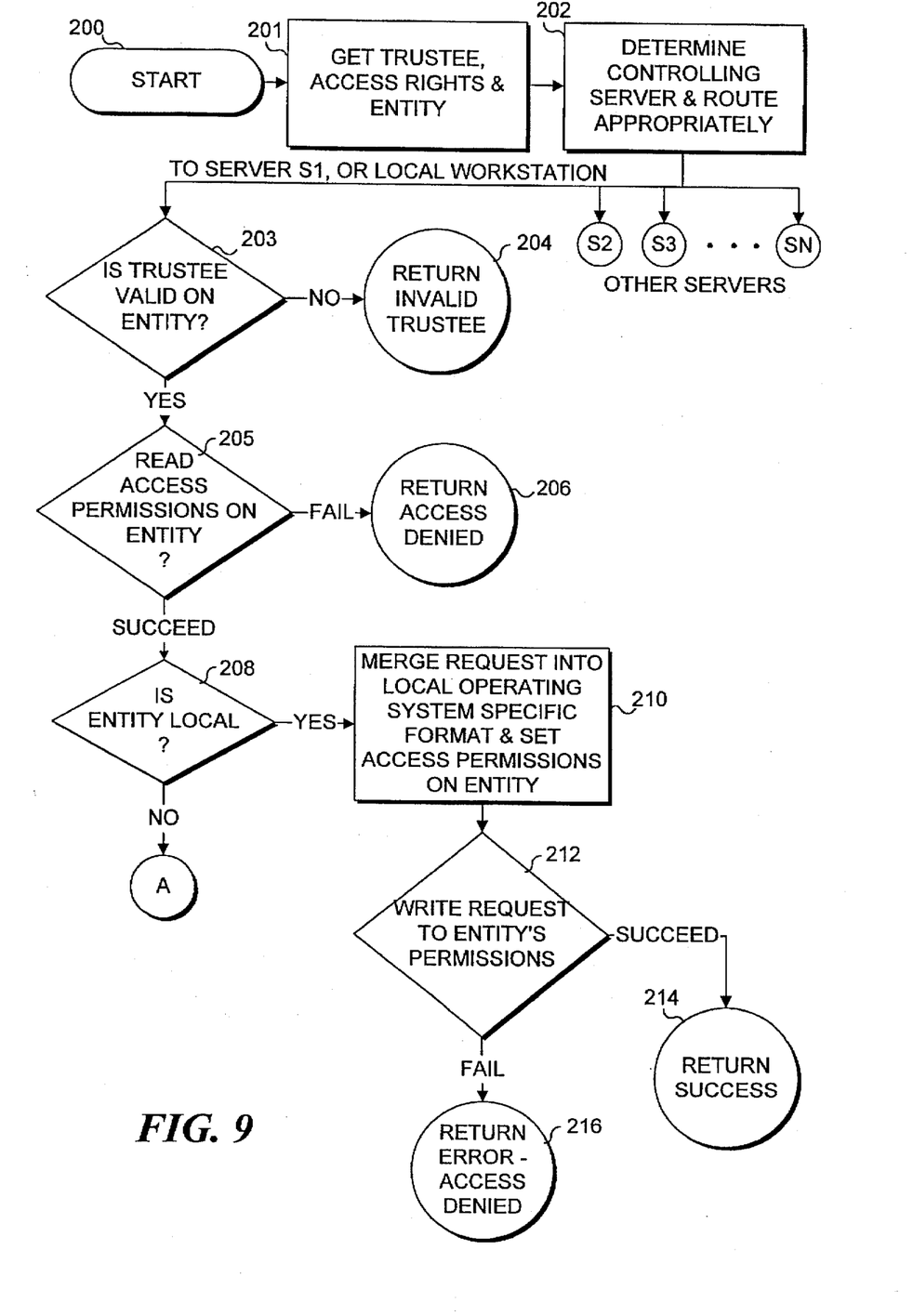
FIG. 9 is a first portion of a flow chart that shows the logical steps implemented to select and control access to an entity on the network.
Figure 10:
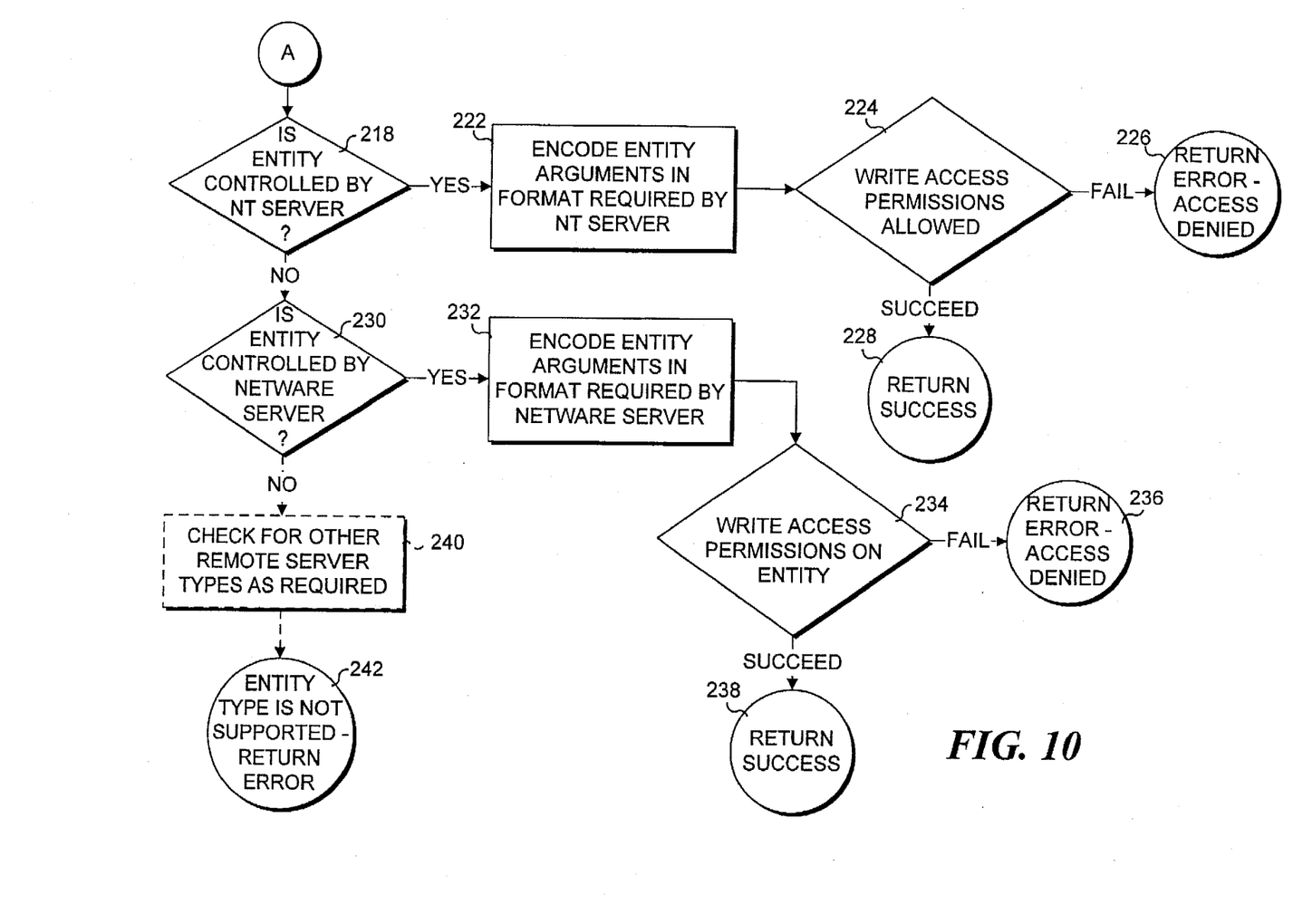
FIG. 10 is a second portion of the flow chart of FIG. 9.

The procedure used for controlling access to a selected entity (object or container) on the network is shown in a flow chart comprising FIGS. 9 and 10. Beginning at a start block 200 in FIG. 9, the operating system under which the functions that comprise the present invention run gets the trustee, the access rights, and the name of the entity (object or container), as noted in a block 201. Next the system determines the controlling server for the selected entity, as noted in a block 202. A network may include N servers, S1 through SN. The steps subsequently implemented (as illustrated in the remaining blocks of the flow chart) relate to the server thus determined. In the example, these steps apply to a server S1, which has been identified as the server that controls the selected entity. In a decision block 203, the system determines if the trustee identified by the user is valid on the entity, i.e., does the trustee have access permissions on the server just identified. If not, a block 204 returns an indication that the trustee is invalid.

In a decision block 205, the system attempts to read the access permission information that was returned for the selected entity. If the attempt fails, for example, because the user does not have the required access permissions on the entity, a block 206 indicates that the system has returned an indication that access was denied. If successful in reading the access permissions, a decision block 208 instead determines if the entity is local, i.e., is the entity controlled by the workstation on which the user is connected to the network. If so, the logic proceeds to a block 210.

In block 210, the system merges the request made by the user for setting access permissions to the selected entity into a local operating system-specific format (i.e., the operating system on which the workstation was booted) and sets the access permissions requested by the user for the entity. A decision block 212 then attempts a Write request to the entity's permissions. If successful, the user making the request can write access permissions on the entity, as indicated in a block 214. If not, a block 216 returns an error, indicating that access was denied.

Returning to decision block 208, if the entity is controlled by a remote server, the logic continues at a block A, in FIG. 10. Generally, the logic illustrated in FIG. 10 determines the type of operating system running on the server that controls the entity, so that the access permissions can be appropriately formatted. For example, a decision block 218 determines if the entity is controlled by a server running WINDOWS NT™. If so, a block 222 encodes the generic request for setting access to the entity made by the user into a format that is used by the operating system running on the NT server. A decision block 224 then determines if Write access to the entity's permissions is allowed, and if not, a block 226 provides for returning an error indicating that access by the user to make the requested change in access permissions is denied. Otherwise, a block 228 returns an indication that the change in access permissions for the object or container has been successfully written by the WINDOWS NT server.

If the entity (object or container) is not controlled by a WINDOWS NT server, a decision block 230 determines if the entity identified by the user is controlled by a remote server running Novell's NETWARE™ network operating system. If so, a block 232 encodes or translates the requested access change made by the user into the format required by the NETWARE™ operating system running on the remote server. A decision block 234 then attempts to write the access permissions on the entity, in a manner similar to the steps in decision blocks 212 and 224. If the attempt fails, a block 236 returns an error, indicating that access for writing the access permissions is denied to the user. Conversely, a block 238 indicates success at writing the permissions for the entity.

In a similar manner, if the entity is controlled by a server running a different operating system, the present invention checks for other remote server types (as indicated in a dash line block 240), encodes the request into the required format, and determines whether the user has write access permissions on the entity and whether the write access was successful. If the type of server that controls the entity is not found or is not supported by the interface of the present invention, a block 242 returns an error to the user.

When encoding a request, the system calls the appropriate function (API in the preferred embodiment) for GrantAccessRights, SetAccessRights, DenyAccessRights, RevokeExplicitAccessRights, or ReplaceAllAccessRights, passing the trustee and permission pairs to the function needed to accommodate the generic request made by the user. The function that is called then carries out the translation of the user request to the appropriate operating system-specific format and conveys the request over the network to the operating system running on the server that controls the object or container in question. The operating system on the remote server then grants the request and changes the database, ACL, or other access rights storage mechanism used for the entity in accordance with the request, assuming that the user had the rights to make it and that the trustee requested had the right to receive it.

Although the present invention has been described in connection with the preferred form of practicing it, it will be understood by those of ordinary skill in the art that many modifications can be made thereto within the scope of the claims that follow. Accordingly, it is not intended that the scope of the invention in any way be limited by the above description, but that it be determined entirely by reference to the claims that follow.

The invention in which an exclusive right is claimed is defined by the following:

1. A method for controlling access to an entity on a network, the entity comprising one of a plurality of different types of entities that are controlled by a plurality of different operating systems, comprising the steps of:
   (a) identifying each trustee that can have access permissions to the entity, by querying a network operating system that controls access to the entity;
   (b) selecting a generic request to control access to the entity from a set of predefined generic requests;
   (c) translating the generic request for access control to the entity into a format usable by the network operating system that controls access to the entity; and
   (d) causing the network operating system that controls access to the entity to implement the generic request in said format.

2. The method of claim 1, wherein the entity comprises one of a container and an object.

3. The method of claim 1, wherein the plurality of entities includes hardware objects that are coupled to the network.

4. The method of claim 1, wherein the plurality of entities includes containers for storing data.

5. The method of claim 1, further comprising the step of enabling a user to request setting specific access rights to an entity associated with an application, from within said application, if the user possesses a right to set said specific access rights to said entity.

6. The method of claim 5, wherein in response to a request by the user, the network operating system determines trustees that can have the specific access rights granted to them and returns a list of said trustees in a format that is independent of the network operating system on which the specific access rights are to be set, thereby ensuring that the specific access rights are only granted to trustees entitled to receive them.

7. The method of claim 1, further comprising the step of enabling a user to view a trustee's access permissions to an entity.

8. The method of claim 1, wherein the set of predefined types of generic requests includes at least one of:
   (a) granting of access rights to the entity;
   (b) setting access rights to the entity;
   (c) denying access rights to the entity;
   (d) revoking explicit access rights to the entity;
   (e) replacing all access rights to the entity;
   (f) determining if access to the entity is permitted;
   (g) getting effective access rights for the entity;
   (h) listing trustees who have explicit access rights to the entity; and
   (i) enumerating all trustees that may be granted access rights to the entity.

9. A method for controlling access to an entity on a network that is coupled to servers employing different operating systems, the entity comprising one of a plurality of different types of entities controlled by the different operating systems, comprising the steps of:
   (a) presenting a user with an option to control access to the entity by selecting one access control option from a predefined plurality of access control options;
   (b) enabling the user to identify a trustee to whom said one access control option will apply;

(c) determining that the user has permission to control access to the entity with said one access control option;

(d) automatically identifying the operating system that controls the entity and determining that the trustee identified by the user has permission to access the entity in accordance with said one access control option, by checking an access control list for the entity on said operating system;

(e) translating said one access control option into a request for setting an access to the entity by the trustee corresponding to said one access control option, where the request is in a format used by a server associated with the entity for setting the access to the entity under said operating system; and (f) transmitting said request to said server, said server responding to receipt of the request by setting the access to the entity in accordance with the request.

10. The method of claim 9, wherein the entity comprises one of a container and an object.

11. The method of claim 9, wherein the entity comprises one of a file object, a printer, and a service.

12. The method of claim 9, wherein the entity comprises one of a hardware device and software.

13. The method of claim 9, wherein the predefined plurality of access control options comprises at least one of:

(a) granting of access rights to the entity;

(b) setting access rights to the entity;

(c) denying access rights to the entity;

(d) revoking explicit access rights to the entity;

(e) replacing all access rights to the entity;

(f) determining if access to the entity is permitted;

(g) getting effective access rights for the entity;

(h) listing trustees who have explicit access rights to the entity; and (i) enumerating all trustees that may be granted access rights to the entity.

14. The method of claim 9, wherein the user selects said one access control option from within an application that is executed on the network, said entity being associated with the application.

15. The method of claim 9, wherein the trustee comprises at least one of an individual and a group of individuals.

16. The method of claim 9, wherein details of the access control implemented by the server in response to the request are hidden from the user.

17. The method of claim 9, wherein the access to the entity is requested by a function that is executed from an application when the user selectively controls access to the entity.

18. A system for controlling access to an entity on a network, the entity comprising one of a plurality of different types of entities that are associated with a plurality of different operating systems, said system comprising:

a processor in which a plurality of machine instructions are executed to control the access to an entity, execution of said machine instructions on the processor comprising:

(a) means for enabling the user to specify at least one of a plurality of predefined generic requests for use in controlling access to the entity, said predefined generic requests being independent of the plurality of different operating systems that are associated with the entities; and (b) translation means for translating said at least one predefined generic request for controlling access to the entity into a system request having a format usable by a network operating system running on a server associated with the entity, in order to cause the network operating system running on said server to implement the system request and to set access to the entity accordingly.

19. The system of claim 18, wherein the means for enabling the user to specify, and the translation means are implemented as functions executed from within an application run by the processor.

20. The system of claim 18, wherein the entity comprises one of a container and an object.

21. The system of claim 18, wherein the entity comprises one of a file object, a printer, and a service.

22. The system of claim 18, wherein said at least one of the generic requests comprises a request for:

(a) granting of access rights to the entity;

(b) setting access rights to the entity;

(c) denying access rights to the entity;

(d) revoking explicit access rights to the entity;

(e) replacing all access rights to the entity;

(f) determining if access to the entity is permitted;

(g) getting effective access rights for the entity;

(h) listing trustees who have explicit access rights to the entity; and (i) enumerating all trustees that may be granted access rights to the entity.

* * * * *

UNITED STATES PATENT AND TRADEMARK OFFICE
CERTIFICATE OF CORRECTION

PATENT NO. : 5,675,782
DATED : October 7, 1997
INVENTOR(S) : Montague et al.

It is certified that error appears in the above-indentified patent and that said Letters Patent is hereby corrected as shown below:

| <u>Column</u> | <u>Line</u> | |
|---|---|---|
| 2 | 11 | "MicrosoR" should read --Microsoft-- |
| 2 | 62 | "genetic" should read --generic-- |
| 2 | 64 | "genetic" should read --generic-- (both occurrences) |
| 3 | 46 | "DRAWINGS" should read --DRAWING-- |
| 6 | 14 | "genetic" should read --generic-- |
| 8 | 25 | "SERVER NT2" should read --SERVER_NT2-- |
| 9 | 8 | "0K" should read --OK-- |
| 9 | 53 | "Cancel" should read --<u>C</u>ancel-- |
| 9 | 54 | "Add" should read --<u>A</u>dd-- |
| 9 | 54 | "Remove" should read --<u>R</u>emove-- |
| 9 | 54 | "Help" should read --<u>H</u>elp-- |
| 10 | 8 | "genetic" should read --generic-- |
| 10 | 27 | "tight" should read --right-- |

Signed and Sealed this

Seventeenth Day of February, 1998

*Attest:*

BRUCE LEHMAN

*Attesting Officer*     Commissioner of Patents and Trademarks